(No Model.)
J. HARTNESS.
CHUCK.
No. 601,513.        Patented Mar. 29, 1898.
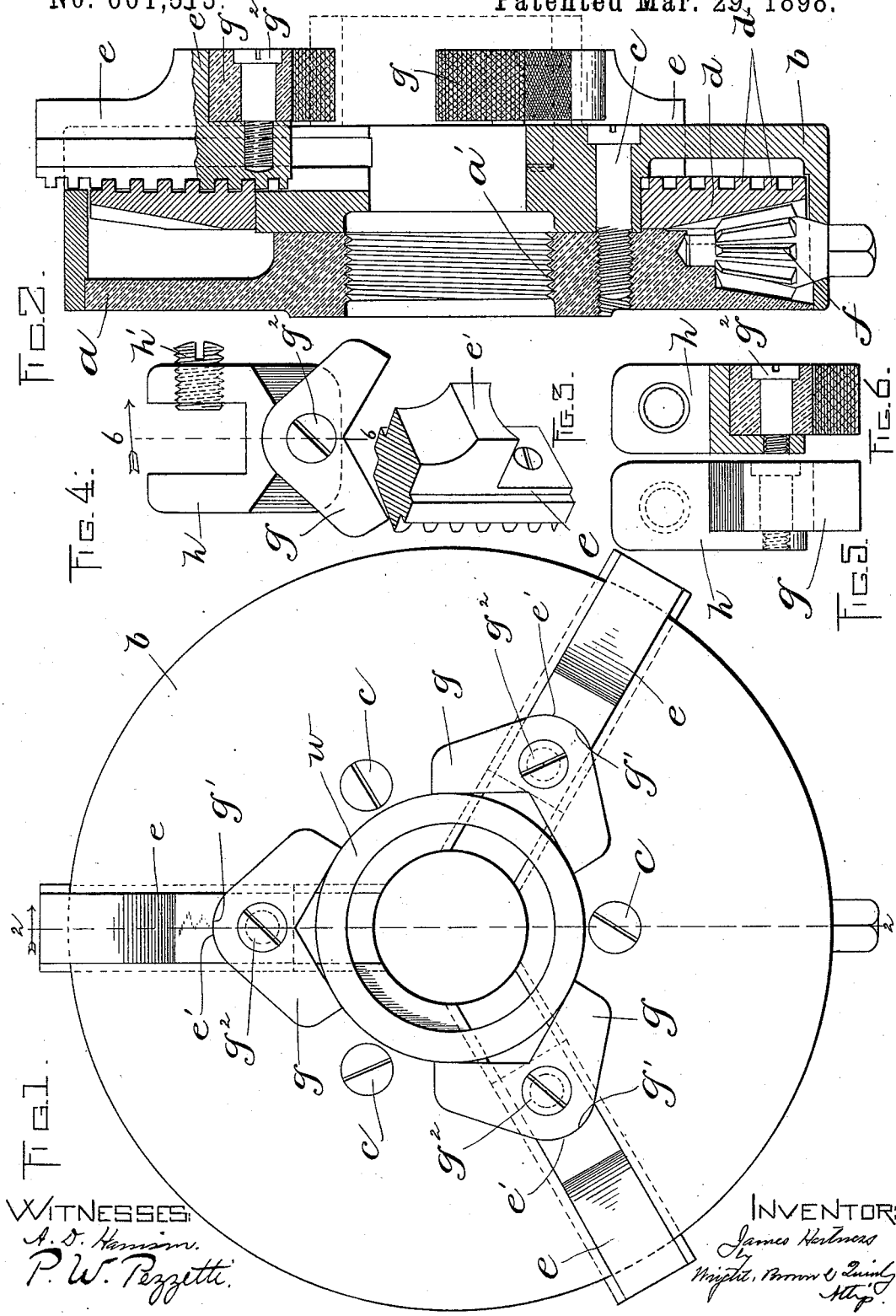
WITNESSES:
A. D. Hanson.
P. W. Pezzetti.
INVENTOR:
James Hartness
by Wright, Brown & Quinby
Attys.

UNITED STATES PATENT OFFICE.

JAMES HARTNESS, OF SPRINGFIELD, VERMONT.

CHUCK.

SPECIFICATION forming part of Letters Patent No. 601,513, dated March 29, 1898.

Application filed May 18, 1897. Serial No. 637,044. (No model.)

*To all whom it may concern:*

Be it known that I, JAMES HARTNESS, of Springfield, in the county of Windsor and State of Vermont, have invented certain new and useful Improvements in Chucks, of which the following is a specification.

This invention, which relates to lathe-chucks, has for its object to provide certain improvements in the construction of the chuck-jaws looking toward a more advantageous contact with the work which they hold.

The invention consists in the improved construction of chucks which I shall now proceed to describe and claim.

Of the accompanying drawings, forming part of this specification, Figure 1 represents a face view of a three-jaw chuck constructed according to my invention. Fig. 2 represents a section on the line 2 2 of Fig. 1. Fig. 3 is a detail perspective view which will be further referred to hereinafter. Fig. 4 represents a face view of a modified construction. Fig. 5 represents an edge view of the same. Fig. 6 represents a section on line 6 6 of Fig. 4.

The same reference characters indicate the same parts in all the figures.

Referring to the drawings, in which is represented a universal chuck of the scroll type, this being selected merely to illustrate an application or embodiment of my invention, the letters $a$ and $b$ designate, respectively, the back plate and the face-plate, which together make up the body of the chuck and are held together by screws $c\ c$, the back plate $b$ being centrally bored and threaded at $a'$ to receive the end of the live-spindle of a lathe. In the cavity between the two plates is located the scroll-plate $d$, upon the face of which is formed the spiral thread or scroll $d'$, which is employed to operate the jaws $e\ e$. To turn the scroll-plate, a bevel gear-pinion $f$ is provided, which meshes with gear-teeth on the back of said plate and by its turning operates to move the chuck-jaws in or out in their guides, the said jaws being provided with threads on their rear portions, which engage the thread on the scroll-plate.

It is common at present to bring the chuck-jaws directly into contact with the work which is being held, the jaws being provided with suitable gripping portions or bites of various shapes adapted to the character of the work. With the ordinary three-jaw chuck having three points of contact with the work a thin ring, such as the ring $w$ or similar piece of work, is apt to be bent out of shape more or less by the pressure of the jaws. In order to obviate this and other objections of a like character arising from the old construction, I provide the inner end of each jaw $e$ with a pivoted V-shaped dog $g$, as shown, there being (where the chuck is a three-jawed one) an angle of one hundred and twenty degrees between the sides of the V in order to obtain tangential contact with cylindrical work. The dogs are pivoted on shouldered pins $g^2$, which screw into the ends of the jaws, and each is rounded on its outer end to the arc of a true circle concentric with the pivot, the rounded portion fitting against a complemental rounded shoulder $e'$ on the jaw. These shoulders, which are shown clearly in Fig. 3, give backing to the dogs and are made somewhat shorter than the segmental portions thereof in order to allow a small amount of rotation or pivotal play to each dog. This pivotal adjustability is very important, since it allows the dogs to adapt themselves to irregularities in the surface of the work and distributes evenly the pressure of the jaws thereon. It will be seen that by this construction I have provided six points of contact with the ring $w$ instead of three. These contact-points, with the above-mentioned angle between the V-arms and up to certain diameter limits depending upon the length of said arms, will be equally spaced around a cylindrical body, such as the ring $w$, and the liability to bending of the same is greatly decreased.

As indicated in Figs. 4, 5, and 6, I have also embodied my invention in an attachment adapted for use on the ordinary forms of chuck-jaws without the necessity of a special construction. As here shown, the attachment consists of a pivoted dog $g$, similar to those just described and mounted on a block $h$, which is recessed and provided with a set-screw $h'$, by means of which it may be clamped to the ordinary form of chuck-jaw. Said jaw then becomes the equivalent of those shown in Figs. 1, 2, and 3 and operates in a similar manner to hold the work.

My improvements may be applied to universal or independent chucks, and although particularly adapted to three-jaw chucks may obviously be applied to those having more or less than three.

The above-described details of construction may be variously modified to meet requirements without departing from the spirit of my invention.

I claim—

1. A chuck having radially-disposed jaws provided with pivoted work-holding dogs, each adapted to contact with the work at two or more points and to conform to the same by oscillations transverse to the axis of the chuck.

2. A chuck having radially-disposed jaws provided with work-holding dogs, each pivoted to oscillate transversely to the axis of the chuck, and each provided with a V-shaped recess, whereby the pressure of the jaws is distributed and equalized upon the work.

3. An attachment for chuck-jaws comprising a recessed block adapted to be clamped to the working portion of the jaw, and a dog pivoted thereto and adapted to oscillate in a plane transverse to the axis of the chuck.

In testimony whereof I have signed my name to this specification, in the presence of two subscribing witnesses, this 13th day of May, A. D. 1897.

JAMES HARTNESS.

Witnesses:
D. S. BROWNELL,
J. W. BENNETT.